June 2, 1970  J. B. SPIVEY  3,515,862
WATERPROOF LIGHT ASSEMBLY
Filed Sept. 22, 1967
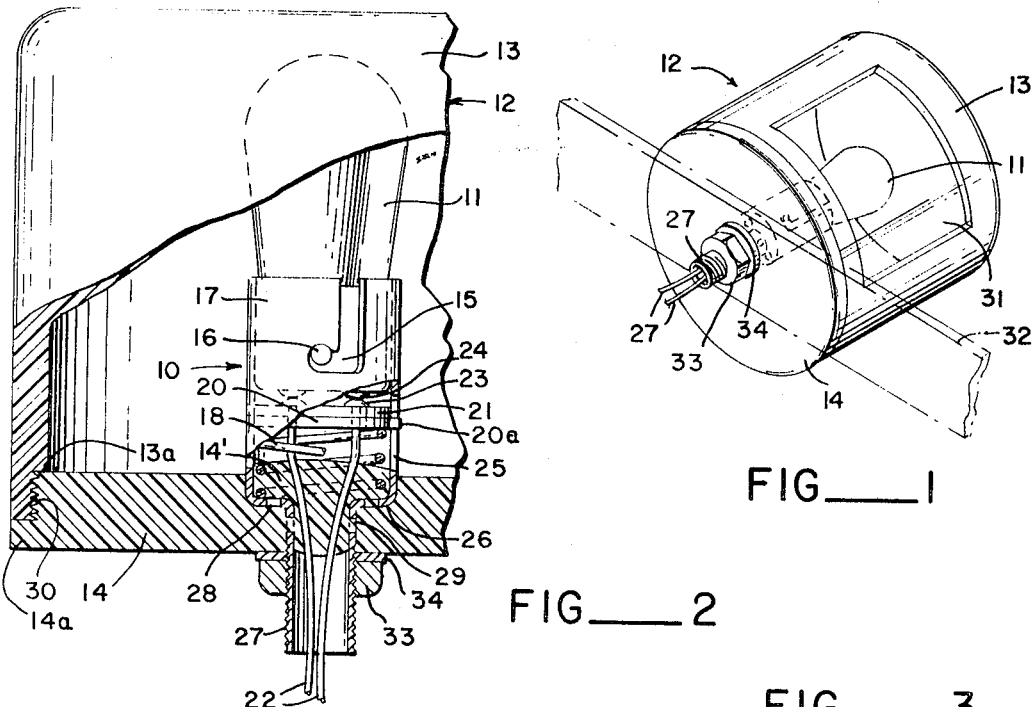
FIG___1
FIG___2
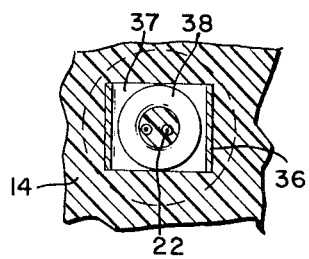
FIG___4
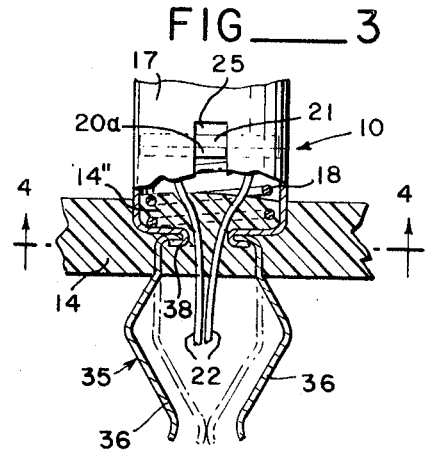
FIG___3
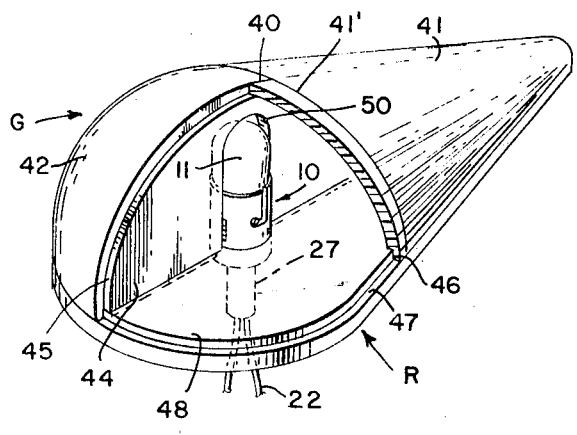
FIG___5
INVENTOR.
JACK B. SPIVEY
BY
Seed Berry & Dorsey
ATTORNEYS

United States Patent Office 3,515,862
Patented June 2, 1970

3,515,862
WATERPROOF LIGHT ASSEMBLY
Jack B. Spivey, Omak, Wash. 98841
Filed Sept. 22, 1967, Ser. No. 669,874
Int. Cl. B63b 45/04
U.S. Cl. 240—7.5
9 Claims

ABSTRACT OF THE DISCLOSURE

A waterproof light assembly in which a domical lens has a dielectric base closure through which an electrically conductive bulb socket member extends having a center sealing plug integrally connected with the base closure through an opening in the socket. Mounting means extend from the base plate and take the form of a hollow stud extension of the socket member or a spring clip, and together with the socket member may serve as the ground for the bulb.

---

The present invention relates to waterproof light assemblies to be used, for example, as tail lights for boat trailers or as boat running lights.

It is common in the launching of a boat from a trailer, or in reloading the boat on the trailer, to back the trailer so far into the water that the trailer tail lights become submerged. As a consequence, water enters and is trapped in the light housing resulting in corrosion of the socket components, shorting of the terminals, and frequently premature light failure. This difficulty is accentuated under salt water conditions and is also experienced with boat running lights frequently subjected to wash and spray while the boat is underway and to high humidity while moored.

This invention aims to provide an improved light assembly for vehicles and boats which is of simple and economical construction, durable, uses standard bulbs, and yet is waterproof even when submerged.

The invention further aims to provide such an improved light assembly which contains its own mounting means and can be easily mounted.

Other and more particular objects and advantages of the invention will, with the foregoing, appear and be understood in the course of the following description and claims, the invention consisting in the novel construction and in the adaptation and combination of parts hereinafter described and claimed.

In the accompanying drawing:

FIG. 1 is a perspective view of a light assembly embodying the present invention;

FIG. 2 is a fragmentary longitudinal vertical sectional view with parts broken away of the light assembly to an enlarged scale;

FIG. 3 is a detail sectional view showing an alternative mounting means;

FIG. 4 is a sectional view taken as indicated by the line 4—4 in FIG. 3; and

FIG. 5 is a perspective view with parts broken away illustrating the invention embodied in a boat running light.

Referring to the drawing, it is seen that the light assembly of the invention includes a socket 10 for an incandescent bulb 11 and a waterproof housing 12 comprising a translucent lens 13 and a molded base plate 14 to which the socket is anchored. The socket 10 is of standard construction in that it has a pair of diametrically opposed bayonet slots 15 for receiving locking pins 16 radiating from the base ferrule 17 of the bulb 11. To keep the pins 16 seated in the offsets of the slots 15 the socket 10 contains a compression spring 18 which acts against a guide plate 20 and terminal plate 21 opposing the base of the bulb. These plates are formed of a dielectric material and have registering openings therethrough for the passage of leads 22 in turn fitted with enlarged button terminals 23 on their inner ends arranged to be engaged by the contacts 24 on the base of the bulb. It will be noted that the terminals 23 are kept in fixed angular relationship relative to the bayonet slots 15, in order to assure engagement between the terminals and the bulb contacts 24, by way of a pair of radially projecting ears 20a on the guide plate 20 which ride in respective axial guide slots 25 formed in the wall of the socket 10 beneath and at a ninety degree disposition from the bayonet slots.

To the extent thus far described the socket 19 is conventional. However, as part of the present invention the base 26 of the socket is provided with a fastening device and is anchored in the base plate 14. Two embodiments of the fastening device are illustrated. In the first, the socket base 26 is necked and elongated to provide a hollow stud bolt 27 through which the leads 22 are threaded. Of importance is the fact that the socket base 26 and/or the inner end of the stud 27 are formed with ports 28 and 29. The purpose of these ports is to permit the flow of material into the base portion of the socket 10 during molding of the base plate 14. To elaborate, the socket 10 with its plates 20–21, spring 18, and leads 22 as an assembly, are set in the mold cavity for molding the base plate 14 preparatory to injection or pouring of the plastic or glass material for the plate. As a consequence the socket is not only rigidly fixed in the base plate 14 but is sealed at the bottom by a plug 14′ of the base material which flows into the base of the socket and head of the stud 27 during the formation of the base plate. The level of the sealing plug 14′ is low enough in the socket 10 as not to deter action of the spring 18.

Around its periphery the base plate 14 is stepped and threaded at 30 to seat in a threaded counterbore provided in the lens 13. The lens may be cylindrical, hemispherical, or any other domical shape, and may be formed of glass or plastic, as for example a suitable acrylic, which is colored red or any other selected color for warning, caution or other indication. As is conventional, it may be formed with a transparent clear section 31 for illuminating a license plate. The base plate 14 is preferably made resistant to light transfer by way of the material from which it is formed or by suitably painting its inner and/or outer face. It may be molded from a suitable polyethylene or polypropylene having sufficient resiliency to obtain a good seal on the underside of the border lip 14a of the base plate and at the threads 30 as well as between the inner face of the base plate and the shoulder 13a of the lens.

To assemble the unit, the bulb 11 is fitted into the socket 10, and then the base plate is tightly screwed into the base of the lens 13. To assist in gripping the lens the outer edge of the lip 14a may be serrated. If a disposable assembly is preferred, then the base plate may be permanently bonded to the lens by a suitable adhesive.

Mounting of the first embodiment on a boat trailer or other vehicle is easily performed by passing the stud 27 and leads 22 through an opening in the license holder bracket 32 or other selected frame member and applying a nut 33. A rubber backing washer 34 may also be utilized. The ground circuit for the light is normally conducted from the ferrule 17 of the bulb through the socket 10 and stud 27 to the vehicle frame. In some trailer installations it may be preferred to carry a ground line together with the power lines from the towing vehicle. In such a case the ground line can be conveniently attached to the stud 27 as by a terminal clamped between the nut 33 and the related trailer bracket or frame member.

In the second embodiment the fastening means comprises a spring clip 35 having a pair of opposed V-shaped spring arms 36 projecting from a bridge 37 having a central opening therethrough. The socket base 26 is formed with a short neck which extends through the bridge 37 and is punched outwardly at its free end portion against the bridge to form a retaining flange 38 anchoring the clip 35 to the socket.

The second socket embodiment is molded or cast in place with the base plate 14 in the same general manner as the first. During this operation the base plate material flows through the open bottom end of the neck 38 into the lower end portion of the socket as indicated at 14″, bonds to the portion of the leads 22 passing through the base plate, and anchors the root end portions 36′ of the spring arms 36. After insertion of the bulb 11, the lens cover 13 is bonded or screwed in place as before described.

To install the second embodiment it is only necessary to force the spring arms 36 together for passage through an opening in the license holder bracket 32 or other frame member on the vehicle. Then when the arms 36 spring back apart the bracket 32 will be gripped in the V between the arms and the outer face of the base plate 14. The ground circuit carries from the socket through the spring arms 36 to the vehicle frame, or a ground lead can be connected to one of the spring arms.

Directing attention to FIG. 5, the present invention is illustrated applied to a boat running light having a starboard green quadrant G and a port red quadrant R which are separated at line 40 and terminate aft at an arcuate line 41′. The latter is defined as the forward edge of a blockout coating 41 applied to respective red and green plastic lenses 42–43 which join at 40. A divider wall 44 may be formed integrally with the starboard lens 42 and is stepped at the top to provide a shoulder 45 for receiving the inner arcuate edge portion of the port lens 43. Along their lower edges the lenses 42–43 have their inner walls offset to provide a lower border lip 46 to interfit with a seat 47 surrounding a base plate 48. This plate has a socket unit 10 with a bulb 11 mounted therein in the same manner as before described with respect to base plate 14 in FIG. 1. It will be noted that the divider 44 has a cutout 50 to accommodate this light assembly and may have a lower positioning lip seated in a longitudinal center groove formed in the base plate 48. The blockout coating 41 may comprise a layer of sprayed chromium for decorative effect as well as blockout function.

The described boat running light assembly can be so inexpensively constructed compared to the conventional running light unit that it may be disposable upon bulb failure. For this reason the lenses 42–43 and base plate 48 are permanently bonded together by a suitable adhesive after the bulb 11 has been inserted in the socket 10. In the alternative the base plate may have a round screw plug (not shown) containing the socket 10 and forming a waterproof connection in the manner of the aforedescribed threads 30.

In mounting the boat running light, the hollow stud 27 is passed through a suitable opening bored in the deck, and clamped in position by application of the nut 33 beneath the deck. The bottom face of the base plate 48 may be made concave to conform with the deck surface.

The embodiments of the invention in which an exclusive property or privilege is claimed are defined as follows:

1. A waterproof light assembly comprising, a domical lens having an open base end, a dielectric base plate closing said open end and providing with the lens a waterproof housing, said base plate having a flat mounting surface for engaging a flat support with an opening therethrough, a socket member extending lengthwise through said base plate into said housing centrally of said mounting surface, lead means extending from outside said housing into the housing through said socket member, a bulb in said housing mounted in said socket member and making electrical connection with said leads, said base plate having an integral sealing plug traversing said socket member and enclosing said lead means, and mounting means connected to said socket member and extending outwardly from said base plate for passing through said opening and anchoring the light assembly with said mounting surface against said support.

2. A light assembly according to claim 1 in which said socket member has bayonet slot means and said bulb has locking pin means received in said slot means, and a compressing spring having one end enclosed in said sealing plug and its other end acting to yieldingly seat said pin means in said slot means.

3. A light assembly according to claim 1 in which said mounting means comprises a hollow stud extension on said socket member projecting outwardly endwise of said base plate to pass through said opening, and fastening means on said stud for engaging the back of said support, said socket member and stud being of an electrically conductive material to provide a ground circuit for the bulb.

4. A light assembly according to claim 3 in which said stud is externally threaded and said fastening means comprises a nut threaded onto the stud.

5. A light assembly according to claim 1 in which said mounting means comprising a yoke anchored in said base plate and having a pair of spring legs projecting outwardly from the base plate to pass through said opening, said lead means passing through an opening in the center of said yoke.

6. A light assembly according to claim 5 in which the center of said yoke is connected to said socket member.

7. A light assembly according to claim 3 in which said socket member is necked within said base plate and presents said hollow stud as an integral part thereof of reduced diameter, said lead means being threaded endwise through said stud.

8. A light assembly according to claim 1 in which said domical lens is of two-piece construction with a central dividing line, one said piece of the lens being red and the other green to serve as a boat running light.

9. A waterproof light assembly comprising, a domical lens having an open face end, a dielectric base plate closing said open end and providing with the lens a waterproof housing, a socket member extending lengthwise through said base plate into said housing, leads extending from outside said housing into the housing through said socket member, a bulb in said housing mounted in said socket member and making electrical connection with said leads, a sealing plug traversing said socket member and enclosing said leads, and mounting means extending from said base plate, said mounting means comprises an externally threaded hollow stud which is an integral extension of said socket member and projects outwardly from said base member, said socket member being of an electrically conductive material, a nut threaded onto said stud, and lateral port means in the socket member within said base plate, said base plate being of one-piece molded plastic construction and having the material thereof extending through said port means and having said sealing plug as an integral part thereof, said socket member with its said stud serving as the ground circuit for the bulb.

References Cited

UNITED STATES PATENTS

| | | | |
|---|---|---|---|
| 2,141,240 | 12/1968 | Dover | 240—7.1 |
| 2,201,044 | 5/1940 | Langdon | 240—7.1 |
| 2,812,423 | 11/1957 | Penna | 240—52.2 |
| 3,345,506 | 10/1967 | Hautzenroeder | 240—8.18 |

NORTON ANSHER, Primary Examiner

A. MATHEWS, Assistant Examiner

U.S. Cl. X.R.

339—218, 188